US005251440A

United States Patent [19]

Bong-dong et al.

[11] Patent Number: 5,251,440

[45] Date of Patent: Oct. 12, 1993

[54] CONTROL APPARATUS AND METHOD FOR AUTOMATICALLY CONTROLLING A HYDRAULIC SYSTEM FOR HEAVY CONSTRUCTION EQUIPMENT

[75] Inventors: Hoang Bong-dong, Changweon; Jo Jang-ug, Chungmu; Jeong Sang-tae, Seoul; Lee Chan-hee, Hoaseong; Song Myeong-hun, Yongho 3-dong; Lee Jin-han, Yeongi, all of Rep. of Korea

[73] Assignee: Samsung Heavy Industries Co., Ltd., Changwon, Rep. of Korea

[21] Appl. No.: 790,769

[22] Filed: Nov. 12, 1991

[30] Foreign Application Priority Data

| | | | |
|---|---|---|---|
| Nov. 13, 1990 | [KR] | Rep. of Korea | 90-18305 |
| Nov. 30, 1990 | [KR] | Rep. of Korea | 90-19522 |
| Dec. 29, 1990 | [KR] | Rep. of Korea | 90-22382 |

[51] Int. Cl.[5] ............ F16D 31/00

[52] U.S. Cl. ............ 60/329; 60/420; 60/428; 60/431; 60/433; 60/445; 60/434; 417/32; 417/34; 417/10; 123/319; 123/350; 123/198 D; 123/179.3

[58] Field of Search ............ 60/329, 420, 428, 431, 60/433, 434, 445, 459, 390; 417/32, 34, 10, 26, 216, 218; 123/319, 350, 179.3, 179.21, 198 D, 357, 358, 359; 91/361

[56] References Cited

U.S. PATENT DOCUMENTS

| | | | |
|---|---|---|---|
| 2,187,712 | 1/1940 | Neeson | 417/10 X |
| 4,183,341 | 1/1980 | Eastman | 123/179.21 X |
| 4,475,332 | 10/1984 | Anderson et al. | 60/329 |
| 4,537,029 | 8/1985 | Gunda et al. | 60/390 |
| 4,683,777 | 8/1987 | Nakayama | 123/198 D X |
| 4,763,473 | 8/1988 | Ziplies et al. | 60/329 X |
| 4,798,050 | 1/1989 | Nakamura et al. | 60/329 |
| 4,904,161 | 2/1990 | Kamide et al. | 417/34 X |
| 5,050,545 | 9/1991 | Shirata et al. | 123/179.21 |
| 5,070,832 | 12/1991 | Hapka et al. | 123/198 D |
| 5,077,973 | 1/1992 | Suzuki et al. | 60/434 X |

*Primary Examiner*—Edward K. Look

*Assistant Examiner*—Todd Mattingly

*Attorney, Agent, or Firm*—Price, Heneveld, Cooper, DeWitt & Litton

[57] ABSTRACT

A control system for automatically controlling the operation of a hydraulic system for heavy construction equipment. The system of this invention provides a controller optimally connected to sensors and to control devices on the hydraulic system so that it automatically and optimally preheats the engine coolant and the hydraulic fluid of the heavy construction equipment before a normal starting operation in order to reach to an optimal operating temperature in a relatively short time. The control system automatically checks the operating temperature of the engine coolant and the hydraulic fluid by temperature sensors, and alarms the operator to any overheat condition by an alarm device. The control system also automatically controls the operational mode in order to remove the overheat condition thus preventing the temperature of the engine coolant and the hydraulic fluid from rising above a predetermined temperature. The system also always optimally starts the engine of the heavy construction, and includes a retry sequence for same.

9 Claims, 7 Drawing Sheets

CONTROL APPARATUS AND METHOD FOR AUTOMATICALLY CONTROLLING A HYDRAULIC SYSTEM FOR HEAVY CONSTRUCTION EQUIPMENT

BACKGROUND OF THE INVENTION

1. Field of The Invention

The present invention relates to a control apparatus and method for automatically controlling a hydraulic system used on heavy construction equipment, such as on an excavator and the like, and more particularly to a control apparatus in which a driving engine of the hydraulic system is always optimally started, and the temperature of the hydraulic fluid for actuators in the hydraulic system is automatically controlled and also is preheated in order to reach to a predetermined temperature, thereby improving the operational effect of the hydraulic system and the construction equipment.

2. Description of The Prior Art

Conventionally, known hydraulic systems for heavy construction equipment such as an excavator or a hydraulic shovel drive system are provided with a plurality of hydraulic pumps which are driven by a diesel engine, the output hydraulic fluid being communicated to a plurality of actuators operably connected to buckets adapted to do work. Thus, a desired operation can be efficiently preformed by the heavy construction equipment.

However, the known hydraulic system for heavy construction equipment has the following disadvantages. When operated with the hydraulic fluid in either a cold or overheated condition, the hydraulic system operates roughly and in a manner not typical of the normal operating characteristics of the system. This results in fatigue to the equipment operator, the fatigue causing the operator and the equipment to provide a lower quality job than the heavy construction equipment is capable of. This also causes the driving power of the engine to be wasted by inefficiently moving overheated or underheated hydraulic fluid. Still further, the overheated or underheated hydraulic fluid results in rough movement of the actuators, causing the actuators to be broken and/or causing safety accidents to occur during use of the equipment.

The driving engines of the known hydraulic system for heavy construction equipment have to be preheated before starting normal operation. This is typical of many types of equipment and vehicles which have to be preheated in order to reach a desired operating temperature. However, it is especially true of the heavy construction equipment, since the hydraulic fluid has to be preheated before starting normal machine operation in order to allow the hydraulic fluid to achieve a desired temperature and operating viscosity.

However, the known hydraulic system for heavy construction equipment has no apparatus for sensing the temperature of the hydraulic fluid and no apparatus for controllably heating the hydraulic fluid to the desired temperature. As a result, the operator must use his experience to estimate or guess at the temperature of the hydraulic fluid after considering the ambient temperature and peripheral temperature around the heavy construction equipment. The operator must then preheat the hydraulic fluid of the heavy construction equipment for a time in order to raise the temperature of the hydraulic fluid to the desired temperature. Thus, the known hydraulic system for heavy construction equipment has a disadvantage in that the preheating operation for the hydraulic fluid is not optimally and accurately performed. For example, if the preheating operation is carried out for too long of a time period, the hydraulic fluid becomes overheated resulting in driving power loss and system inefficiencies. On the other hand, if the preheating operation is not carried out for a long enough time period, the temperature of the hydraulic fluid does not reach the desired temperature, resulting in the engine of the hydraulic system being overloaded due to the cold temperature of the hydraulic fluid.

Second, the known hydraulic system for heavy construction equipment is conventionally provided with a plurality of hydraulic pumps which are each connected to a drive shaft of the engine, and is also provided with a plurality of actuators which are driven by the hydraulic fluid outputted from the hydraulic pumps. In addition, the known heavy construction equipment is provided with several operational modes, each previously programmed in a control circuit. The control circuit allows the operator to select one of the programmed operational modes depending upon a given operational condition, the operational condition being a function of ambient temperature, the machine temperature, the prospective machine speed and work to be done, and the like. The operational speed of the hydraulic system of the heavy construction is varied depending on the selected mode and operational condition. However, if an improper mode is selected, the machine will operate at a less than optimal operational speed.

For example, a known hydraulic system for heavy construction equipment is disclosed in Korean Patent Application No. 90-15862, which application was applied for by the applicant of this invention. The hydraulic system is provided with three operational modes each previously programmed in the control circuit thereof. In a first mode, an "H operational" mode, a maximum quantity of fuel is supplied to the engine in order to drive the engine at a maximum rotative speed so that the operational speed of the heavy construction equipment reaches to a maximum operational speed. In a second mode, an "S operational" mode, the engine is driven at a normal rotative speed (which is about 10–20% below the maximum rotative speed) in order to accomplish a normal speed of operation. In a third mode, an "L operational" mode, the engine is driven at a still lower rotative speed (which is about 10–20% below the above-noted normal speed) in order to accomplish a quieter operation. During operation of the above known construction equipment, the operator selects one of the programmed operational modes, i.e. one of the H, S and L operational modes, by means of an operational mode select switch provided in the control cab. The operator preferably makes his selection depending on the operational condition expected.

However, if the heavy construction equipment is operated for a long time on the H operational mode, the respective temperature of the engine coolant and the hydraulic fluid is likely to exceed the predetermined maximum allowable overheat temperature. Hence, where the equipment is operated a long time under the H operational mode, the operator has to repeatedly and frequently check the respective temperature of the engine coolant and the hydraulic fluid and manually reduce the engine speed in order to prevent overheating. Furthermore, the operator may need to temporarily stop the operation of the heavy construction in order to cool or replace the overheated engine coolant with new coolant and in order to cool or replace the hydraulic fluid with new hydraulic fluid. Therefore, the known heavy construction equipment has a disadvantage in that a continuous operation may lead to an overheat condition which would undesirably affect the operation and efficiency of the equipment and potentially also undesirably burden the operator with changing the engine coolant and the hydraulic fluid.

Third, the hydraulic system in the known heavy construction equipment conventionally adopts a starting manner for the diesel engine in which a fuel supply control valve (a throttle valve) is first positioned at the starting position, and an engine starting switch (mateably engaged with an engine starting key) is then shifted from stop position to starting position in order to start the engine. After starting the engine, and the engine starting switch automatically returns to the stop position. However, the diesel engine has a disadvantage in that cold starting the engine is difficult, thereby resulting in multiple restart attempts. These multiple and extended restart attempts frequently lead to starter motor breakdown and dead batteries. In addition, the diesel engine requires a special "cold start" in case of starting under a cold temperature. In the cold start, the engine is either preheated for a time before the normal starting sequence in order to raise the temperature of the engine to a desired temperature, or an additive such as an ether is supplied to the engine before beginning the starting sequence. Thus, the known hydraulic system for heavy construction equipment utilizing a standard diesel engine arrangement has a disadvantage in that it can not provide reliability and quick start of the engine.

SUMMARY OF THE INVENTION

It is, therefore, an object of this invention to provide an apparatus and method for automatically controlling operation of a hydraulic system for heavy construction equipment in which the above disadvantages can be overcome. In one aspect, the temperature of hydraulic fluid is automatically and efficiently preheated in order to reach to a desired temperature in a relatively short time, thereby eliminating a waste of energy and time due to an excessive preheating.

It is another object of this invention to provide an apparatus and method for automatically controlling operation of a hydraulic system for heavy construction equipment in which sensors are provided for sensing respective overheating temperatures of the hydraulic fluid and engine coolant due to continued high speed operation of the equipment. The apparatus and method include an alarm for alarming the operator to the occurrence of the overheat and automatically changing the operational mode into a relatively low speed operational mode in order to cool the engine coolant and the hydraulic fluid, thereby efficiently and reliably preventing the engine coolant and the hydraulic fluid from being overheated. The apparatus and method thereby also provide a continuous operation.

It is still another object of this invention to provide an apparatus and method for automatically controlling operation of a hydraulic system for heavy construction equipment in which the engine is always optimally started irrespective of ambient conditions around the equipment, thereby improving the starting reliability of the engine.

In one aspect, the above objects of this invention can be accomplished by providing a control apparatus for automatically controlling the operation of a hydraulic system comprising an engine for generating output power; a plurality of actuators; an electronic controller for controlling the operation of the actuators; main hydraulic pumps driven by the engine for supplying hydraulic fluid for the actuators; a sub-hydraulic pump driven by the engine for supplying pilot hydraulic fluid; swash plate inclination valves connected to the controller and the main pumps for controlling inclination angles of the main hydraulic pumps to control the quantity of hydraulic fluid flow outputted therefrom; positional sensors provided at respective actuators to sense positional displacement values of the actuators; a directional control valve block connected to the main hydraulic pumps and the electronic controller for controlling operational direction of the actuators and also the quantity of the hydraulic fluid flow; control levers/pedals for outputting respective electric signals to the controller corresponding to manipulation values for controlling actuators; an amplifier connected to the controller for amplifying an electric signal outputted from the controller to the swash plate inclination angle control valves; relief valves disposed on a hydraulic conduit between the directional control valve block and the main hydraulic pumps for preventing the hydraulic conduit from being overpressurized; directional control solenoid valves connected to the directional control valve block; and a solenoid valve connected to the controller, the directional control solenoid valves and the relief valves for selectively controlling preset pressures of the directional control solenoid valves and the relief valves. The control apparatus further comprises means for sensing respective temperatures of engine coolant and the hydraulic fluid, the means for sensing being disposed at the engine and the hydraulic pumps, respectively; means for alarming the operator to occurrence of overheat in response to a control signal from the controller when the temperature of one of the coolant and the hydraulic fluid is higher than a respective predetermined reference overheat temperature, said means being electrically connected to the controller; means for controlling the running speed of the engine, the means for controlling reducing the running speed of the engine when the temperature of the one of the coolant and the hydraulic fluid is higher than the respective predetermined reference overheat temperature, but increasing the running speed of the engine when the respective temperature of the coolant and the hydraulic fluid is lower than a respective predetermined safety operational temperature, the means being electrically connected to the controller; wherein each operational temperature of the coolant of the engine and the hydraulic fluid is automatically controlled.

In another aspect, a control method is provided for automatically controlling the operation of a hydraulic system using a control apparatus including a hydraulic system including hydraulic fluid. The control apparatus comprises providing an engine including coolant and having a running speed, a controller for controlling the running speed, means connected to the controller for sensing temperatures of the engine coolant and the hydraulic fluid of said hydraulic system, means connected to the controller for giving an alarm to the operator in response to a control signal from the controller when temperatures of the engine coolant and the hydraulic fluid are higher than respective predetermined reference overheat temperatures, means connected to the controller for controlling the running speed of the engine in such a manner than the means reduces the running speed of the engine when the temperatures of the coolant and the hydraulic fluid are higher than the respective predetermined reference overheat temperatures, but which also increases the running speed of the engine when the temperatures of the coolant and the hydraulic fluid are lower than predetermined safety operational temperatures, and means for generating a signal corresponding to an initial operational mode of the hydraulic system and to additional operational modes of the hydraulic system. The control method comprises the steps of: receiving the signals corresponding to the respective temperatures of the engine coolant and the hydraulic fluid outputted from the means for sensing temperatures and receiving the signal corresponding to an initial operational mode of the hydraulic system, and then comparing the respective temperatures with the respective predetermined reference overheat temperatures, respectively; outputting an alarm signal to the means for giving an alarm to the operator when at least one of the temperatures is above the respective predetermined reference overheat temperature; and receiving updated signals corresponding to present temperatures of the engine coolant and the hydraulic fluid outputted from the means for sensing temperatures and receiving an updated signal corresponding to a present operational mode of the hydraulic system, and then comparing the respective present temperatures with the respective predetermined reference overheat temperatures, respectively, and also comparing the present operational mode with the initial operational mode.

In another aspect, a control method is provided for automatically controlling the operation of a hydraulic system using a control apparatus. The hydraulic system comprises providing an engine for generating output power, the engine including engine coolant; a plurality of actuators; main hydraulic pumps operably connected to the engine, the main hydraulic pumps being driven by the output power of the engine and being operably connected to the actuators to deliver pressurized hydraulic fluid to the actuators, the main hydraulic pumps including a swash plate to control the quantity of hydraulic fluid being pumped; a controller; control levers and pedals adapted to generate output signals corresponding to manipulation values, the control levers and pedals being operably connected to the controller for controlling the actuators; swash plate inclination angle control valves for controlling the inclination angles of the swash plates of the main hydraulic pumps in order to control quantity of the pressurized fluid to be delivered by the main hydraulic pumps; a hydraulic conduit for allowing the pressurized fluid to be supplied to the actuators from the main hydraulic pumps; relief valves operably connected to the hydraulic conduit to prevent over-pressurization of the hydraulic conduit; directional control solenoid valves for controlling quantity and flow direction of the pressurized fluid to be supplied to the actuators and a solenoid valve for selectively controlling preset pressures of the directional control solenoid valves and the relief valves. The control apparatus comprises means for sensing respective temperatures of the engine coolant and the pressurized fluid of the hydraulic system. The control method comprises the steps of: receiving the signal corresponding to the temperature of the hydraulic fluid, the signal being outputted from the means for sensing temperatures, and, receiving the signals corresponding to manipulation values for controlling the actuators outputted from the control levers and pedals, and then comparing the temperature of the pressurized fluid with a predetermined permissible lowest temperature; determining whether the manipulation values are zero; when the temperature of the hydraulic fluid is lower than the predetermined permissible lowest temperature and the manipulation values are zero, outputting a control signal to the swash plate inclination angle control valves in order to maximize the quantity of the pressurized hydraulic fluid delivered by the main hydraulic pumps and simultaneously outputting control signals to the directional control solenoid valves and the solenoid valve to increase the resistance between the pressurized fluid and the relief valves when the pressurized fluid passes through the relief valves to thereby cause the temperature of the pressurized fluid of the main hydraulic pumps to rise at an increased rate because of the increased pressure loss at the relief valves; and upon comparison of the temperature of the hydraulic fluid with a predetermined desired operational temperature, shutting off the control signals having been applied to both the swash plate inclination angle control valves and the solenoid valves when the temperature of the hydraulic fluid is higher than the predetermined desired operational temperature, whereby the temperature of the pressurized fluid is automatically controllably preheated in order to reach the predetermined desired operational temperature.

In another aspect, a control method is provided for automatically controlling the operation of a hydraulic system using a control apparatus. The hydraulic system comprises an engine for generating output power for driving hydraulic pumps, the engine including coolant and a running speed, and control levers and pedals for outputting signals corresponding to manipulation values for controlling the actuators, the control levers and pedals having a neutral position. The control apparatus comprises an engine ON/OFF switch for generating a starting signal, a controller which is electrically connected to the engine ON/OFF switch for outputting a signal corresponding to starting and stopping of the engine, a start motor for driving the engine in response to the starting signal outputted from the engine ON/OFF switch, a governor for the engine including a throttle valve, a throttle motor for controlling the throttle valve of the governor of the engine, means for sensing the running speed of the engine, means for sensing the temperature of the engine coolant, a fuel supply control valve for controlling fuel supply from a fuel tank to the governor of the engine, a D.C. power supply for supplying D.C. power to the engine ON/OFF switch and the start motor of the engine, a preheater for preheating the engine and an alarming device for giving an alarm to the operator when the hydraulic system has a problem. The control method comprises the steps of: when the engine ON/OFF switch is positioned at its ON position, driving the throttle motor in order to set the throttle valve of the governor to a starting position simultaneously with turning on the fuel supply control valve; when the engine ON/OFF switch is positioned at its START position, determining whether the control levers and pedals are positioned at their neutral positions; when the control levers and pedals are positioned at their neutral positions, turning on the start motor in order to cause the engine to start and then determining whether an actual running speed of the engine is higher than a predetermined running speed; when the running speed of the engine is higher than the predetermined running speed, turning off the start motor in order to end the starting operation; and when the engine does not start and thus the running speed of the engine is lower than the predetermined running speed, repeatedly generating a restart signal to make the engine restart a limited number of additional times, and when the temperature of the engine coolant is lower than a predetermined temperature, turning on the preheater.

BRIEF DESCRIPTION OF THE DRAWINGS

The above and other objects, features and other advantages of the present invention will be more clearly understood from the following detailed description taken in conjunction with the accompanying drawings, in which: FIGS. 1A and 1B is a partial schematic circuit diagram showing a basic hydraulic circuit connected to a control system for operation of a heavy construction in accordance with the present invention;

DETAILED DESCRIPTION OF THE PREFERRED EMBODIMENTS

Figure 1A:
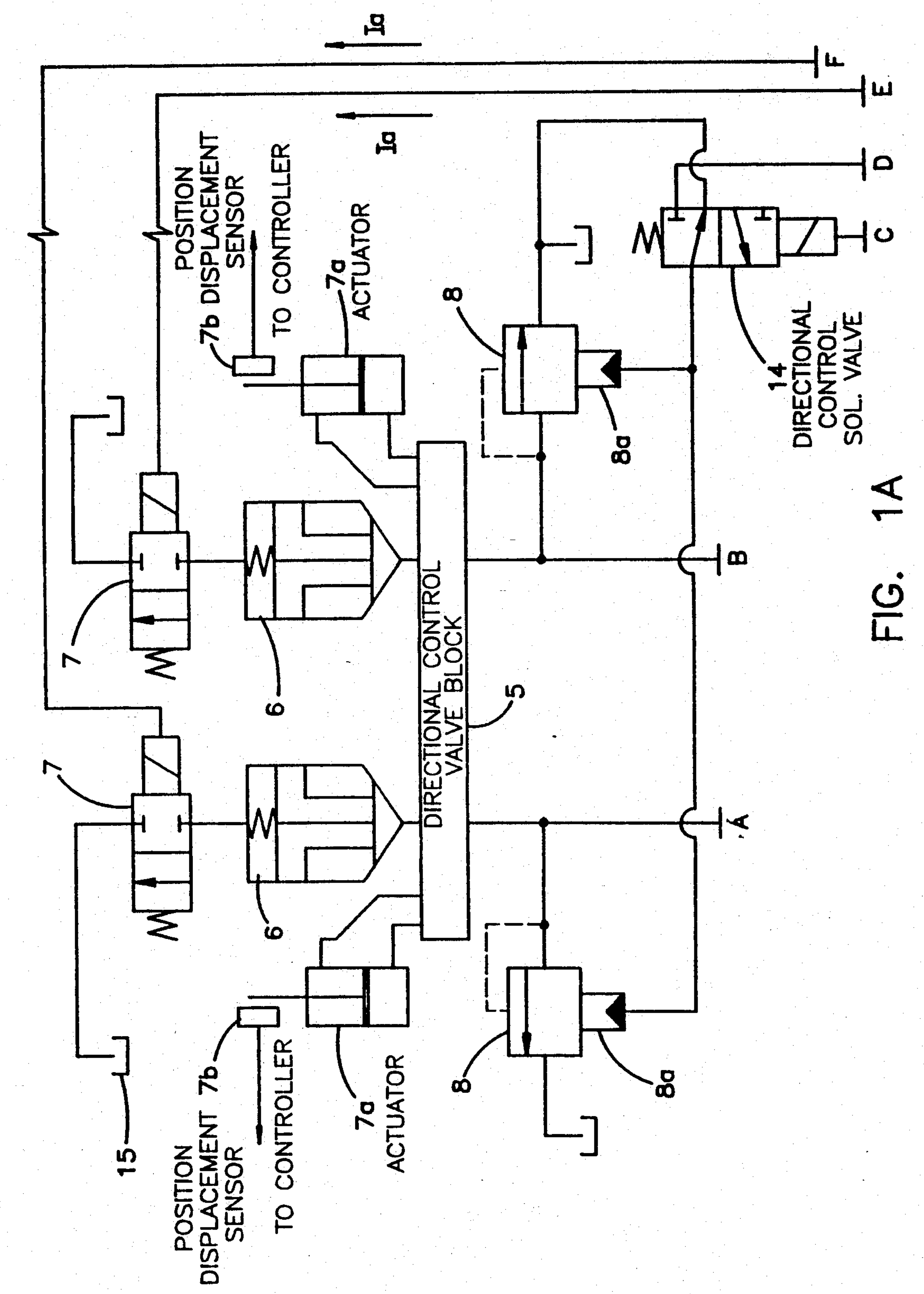
FIGS. 1A and 1B are fragmentary hydraulic circuits which combine to show

Referring now to FIG. 1, there is shown a schematic circuit diagram showing a basic hydraulic circuit connected to a control system for operation of a heavy construction equipment in accordance with the present invention. The hydraulic circuit is provided with a diesel engine 1, a pair of main hydraulic pumps, a first pump 2 and a second pump 3, each connected in-line to a drive shaft 1*a* of the engine 1 in order to output pressurized hydraulic fluid to each actuator 7*a* of the heavy construction equipment. In addition, a third pump 4 is connected to drive shaft 1*a* for outputting a pressurized pilot hydraulic fluid for controlling the quantity of the hydraulic fluid flow outputted from the main pumps 2 and 3 and for controlling the flow direction of the fluid. A directional control valve block 5 is connected to the main pumps 2 and 3 and comprises a plurality of directional control valves each for controlling the quantity of the hydraulic fluid flow from the main pumps 2 and 3 and a flow direction of the fluid for each actuator. The directional control valve block 5 is directly operably connected to a pair of logic valves 6 and a pair of solenoid valves 7.

The third hydraulic pump 4 is connected to a pair of swash plate inclination angle control valves 2*b* and 3*b* (sometimes called "wobbling angle control valves") so that the pilot pressurized hydraulic fluid outputted from the third hydraulic pump 4 is applied to the control valves 2*b* and 3*b*. This allows swash plate inclination angle control valves 2*b* and 3*b* to control a pair of swash plate inclination angle control members or regulators 2*a* and 3*a*, members 2*a* and 3*a* controlling the swash plate inclination angles of the main hydraulic pumps 2 and 3 and hence controlling the pump output volumes. The hydraulic circuit of this invention is also provided with a solenoid valve 14 which is electrically connected to an output port of the controller 9. Valve 14 controls the preset relief pressure of a pair of relief valves 8 each of which is connected between the directional control valve block 5 and the main hydraulic pumps 2 and 3. The relief valves 8 are adapted to prevent overpressure in the hydraulic conduit or passage formed between the main pumps 2 and 3 and the directional control valve block 5.

The controller 9 is electrically connected to the swash plate inclination angle control valves 2*b* and 3*b* so that it outputs electric control signals to the solenoid control valves 2*b* and 3*b* in order to control the inclination angles of the swash plates on the main pumps 2 and 3. The controller 9 is also electrically connected to receive input signals representing manipulation values from a plurality of control levers/pedals 10. This allows an operator to manipulate the control levers/pedals 10 in order to control the operation of the actuators 7*a*. Specifically, manipulation of control levers/pedals 10 outputs an electric signal corresponding to the manipulation values to the controller 9. An amplifier 11 is electrically connected between the controller 9 and the angle control valves 2*b* and 3*b* for amplifying an electric control signal, the signal having been generated in the controller 9 in accordance with the manipulation values of the control levers/pedals 10 and then outputted from the controller 9 to the control valves 2*b* and 3*b*. Positional displacement sensors 7*b* are positioned proximate actuators 7*a* and are connected to controller 9 to feed back the position of actuators 7*b*. The controller 9 is electrically connected to a pair of temperature sensors, a first sensor 12*a* being disposed at the diesel engine 1 for sensing a temperature of the engine coolant and a second sensor 12*b* being disposed at the hydraulic pumps for sensing a temperature of the hydraulic fluid of the hydraulic pumps 2, 3 and 4.

The controller 9 is also electrically connected at its output port to an alarm device 13. Controller 9 is adapted to output an electrical alarm signal to the alarm device 13 upon having received an electric signal of an unacceptably low temperature of the engine coolant and/or the hydraulic fluid from the temperature sensors 12*a* and 12*b* respectively, the unacceptably low temperature being defined as being below a predetermined reference temperature stored in controller 9. The solenoid valve 14 is electrically connected to an output port of the controller 9 so that it selectively controls respective preset pressure of the solenoid valves 7 and the relief valves 8.

Figure 2:
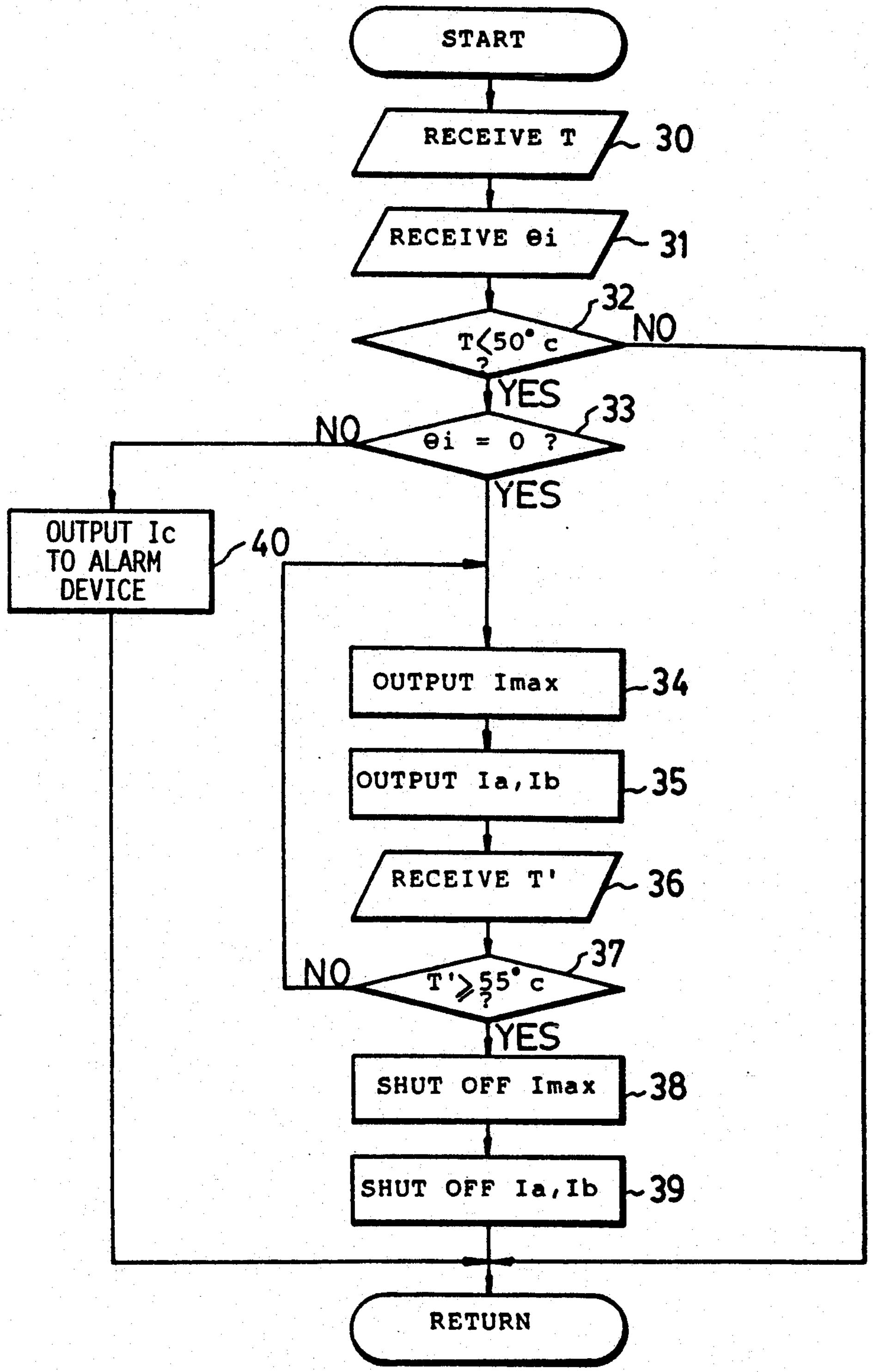
FIG. 2 is a flow chart showing a control method for automatically controlling a preheating operation for the heavy construction in accordance with this invention.

The control system having the above mentioned construction provides a method for automatically preheating the engine coolant and the hydraulic fluid before normally starting the engine 1 in order to allow the temperature of the engine coolant and the hydraulic fluid to rise to respective desired temperature in a relatively short time. The method for preheating is described in detail in a flow chart of FIG. 2.

As illustrated in the flow chart, in step 30 the controller 9 receives a signal corresponding to temperature T of the hydraulic fluid of the pumps 2, 3 and 4 from the second temperature sensor 12*b*. In step 31, controller 9 receives another signal corresponding to manipulation values $\theta i$ for the actuators *7a* from the control levers/pedals 10. Thereafter, the controller 9 performs an inquiry step 32 wherein it is determined whether the temperature T of the hydraulic fluid is lower than an allowable minimum temperature, 50° C. If the temperature T is higher than or equal to the allowable minimum temperature 50° C., the process returns to the start step. However, if the temperature T is lower than the allowable minimum temperature 50° C., the controller 9 performs a next inquiry step 33 wherein it is determined whether the manipulation values $\theta i$ of the control levers/pedals 10 is zero. If the values $\theta i$ of the control levers/pedals 10 is not zero, the temperature T of the hydraulic fluid is considered to be too low for efficient operation of the actuators. Thus, the controller 9 outputs at a step 40 an electric alarm signal Ic to the alarm device 13 in order to alarm the operator of the "too low" temperature.

Alternatively, if the values $\theta i$ of the control levers/pedals 10 is zero, the process simply proceeds to a next step 34 wherein a maximum control signal Imax is outputted from the controller 9 to the swash plate angle control valves 2*b* and 3*b* in order to allow the swash plate angles of the main pumps 2 and 3 to be changed to a maximum fluid volume delivery position. Thus, the main hydraulic pumps 2 and 3 output a respective maximum quantity of hydraulic fluid flow $Q_1max$ and $Q_2max$. Thereafter, the controller 9 performs a step 36 wherein the controller 9 outputs respective electric signals Ia and Ib to the solenoid valves 7 and 14, respectively. Upon receiving the signal Ia, the solenoid valves 7 prevent the hydraulic fluid outputted from the main pumps 2 and 3 from draining into the drain tanks 15. On the other hand, the other solenoid valve 14 upon receiving the signal Ib from the controller 9 controls the present pressure of the relief valves 8 to be equal to 80 $kg/cm^2$ so that the temperature of the hydraulic fluid from the main pumps 2 and 3 rises by virtue of pressure loss occurring when it passes through the relief valves 8.

Upon having received an electric signal corresponding to a changing temperature T' of the hydraulic fluid from the sensor 12*b* at a step 36, the controller 9, in inquiry step 37, determines whether the changing temperature T' is equal to or higher than an adjustable operational temperature 55° C. If the changing temperature T' is lower than the adjustable temperature 55° C., the process returns to the step 34 in order to repeat the steps 34 to 36 until the temperature T' of the hydraulic fluid reaches the adjustable temperature 55° C. However, if the changing temperature T' is equal to or higher than the adjustable operational temperature 55° C., the controller 9 performs steps 38 and 39 to stop outputting the electric signals Ia, Ib and Imax, thereby making the hydraulic circuit of this invention return to its original state.

As described above, the control system of this invention provides a method for automatically and optimally preheating the engine coolant and the hydraulic fluid of the heavy construction before a normal starting operation, thereby providing an advantage in that the engine coolant and the hydraulic fluid can be optimally preheated in order to reach an acceptable operating temperature in a relatively short time.

In addition, the control system of this invention provides a method and an apparatus for automatically sensing respective temperatures of the hydraulic fluid and engine coolant in the event of an overheat condition exceeding respective predetermined overheat reference temperatures. The method and apparatus also then alarm the operator to the occurrence of the overheat condition. Simultaneously, the operational mode of the hydraulic system is changed into another operational mode of relatively lower motor speed in order to cool the engine coolant and the hydraulic fluid, thereby efficiently preventing the engine coolant and the hydraulic fluid from being overheated while continuing to proving a continuous operation. The method and apparatus for controlling respective temperature of the coolant and the hydraulic fluid are described hereinafter in conjunction with the accompanying drawings.

As shown in FIG, 1, the controlling apparatus is provided with a speed control device for accelerating or reducing the driving speed of the engine 1. The device comprises an engine governor 17 provided in the engine 1 for controlling the quantity of the fuel supplied to the engine 1, and a governor/throttle motor 18 connected between the engine governor 17 and the output port of the controller 9. The governor/throttle motor 18 comprises a DC motor or a step motor which can be driven at a rotative speed according to a current of a control signal applied from the controller 9 thereto. Fuel is supplied from a fuel tank 18*a* through throttle valve 17*a* to engine 1 by governor/throttle motor 18.

In addition, the controller 9 is electrically connected to a select switch panel 20 for allowing the operator to select an operational mode. A speed sensing device 16 disposed at the drive shaft 1*a* of the engine 1 for sensing an output rotative speed of the engine 1, the speed sensing device 16 being electrically connected to the input port of the controller 9.

The switch panel 20 is provided with an operational mode select switch 20*a* for selecting an operational mode depending upon an operational condition, an up/down switch 20*b* for allowing the rotative speed of the engine 1 to be accelerated or reduced as required, an automatic reduction switch 20*c* for reducing the rotative speed of the engine to a specific speed (for example, an idling speed) and other switches as required or desired, each said switch being orderly arranged on the switch panel 20. The speed sensing device 16 comprises a sensor such as a gear sensor which can detect signals each generating at every revolutions of a fly wheel of the engine 1 in order to output a signal corresponding to the rotative speed of the engine 1 to the controller 9.

Upon receiving a signal corresponding to a selected operational mode, and other signals from the select switch panel 20, the controller 9 utilizes the received values to determine and output an electric control signal to the governor motor 18 in order to control the quantity of the fuel supplied to the engine 1 by means of the engine governor 17. Specifically, the controller 9 calculates the difference between an output rotative speed of the engine 1 outputted from the speed sensing device 16, and a preset objective reference speed in each operational mode. Thereafter, the controller 9 outputs a control signal to the swash plate inclination angle control valves 2*b* and 3*b* by the way of the amplifier 11 in order to control the swash plate angles of the main pumps 2 and 3, thereby always controlling the quantity of the hydraulic fluid flow.

Figure 3:
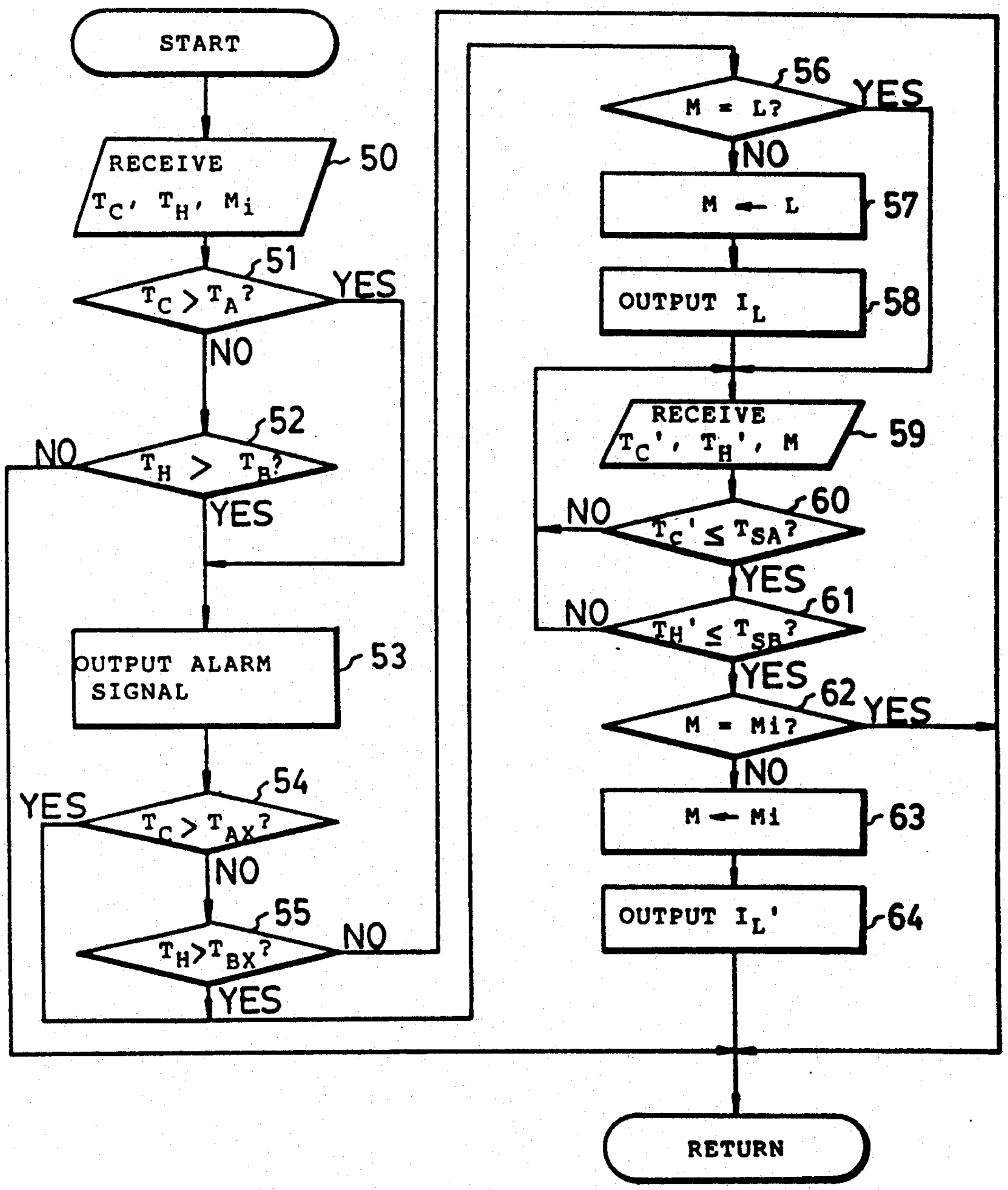
FIG. 3 is a flow chart showing a control method for automatically controlling respective temperatures of an engine coolant and a hydraulic fluid of the heavy construction in accordance with this invention.

FIG. 3 shows a flow chart of a method for controlling overheated engine coolant and overheated hydraulic fluid, the method being performed by the control apparatus of FIG. 1. As shown in the flow chart of FIG. 3, in step 50, controller 9 receives respective temperatures $T_C$ and $T_H$ for the engine coolant and the hydraulic fluid from the temperature sensors 12*a* and 12*b* simultaneously with receiving a selected initial operational mode Mi from the select switch panel 20. Thereafter, the controller 9 performs continuous inquiry steps 51 and 52 wherein it is determined whether either of the respective temperatures $T_C$ and $T_H$ is higher than the respective overheat reference temperatures stored in controller 9. It is contemplated that the reference temperature $T_A$ for the coolant will be 85° C. and the other reference temperature $T_B$ for the hydraulic fluid will also be 85° C. If neither of the respective temperatures $T_C$ and $T_H$ is higher than its respective overheat reference temperature $T_A$ and $T_B$, the operation of the heavy construction equipment is considered to be acceptably normal, and hence normal operation can continue to be carried out without occurrence of an overheat condition. Thus, the process returns to the start step 50 without controlling the temperature of the engine coolant and the hydraulic fluid. However, if even one of the respective temperatures $T_C$ and $T_H$ is higher than the overheat reference temperature $T_A$ and $T_B$, the selected operational mode of the heavy construction is deemed unacceptable and considered to have resulted in occurrence of an overheat condition. Thus, the process continues to step 53 wherein the controller 9 outputs to the alarm device 13, such as an alarm lamp, an alarm buzzer or the like, in order to alarm the operator to the occurrence of the overheat in the engine coolant or the hydraulic fluid.

In steps 54 and 55, the controller 9 determines whether one of the respective actual temperatures $T_C$ and $T_H$ is higher than the respective maximum allowable ("overheat") temperatures. Specifically, the maximum allowable temperature $T_{AX}$ for the coolant is 95° C. and the other maximum allowable temperature $T_{BX}$ for the hydraulic fluid is 95° C. If both of the respective actual reference temperatures $T_C$ and $T_H$ are lower than the allowable overheat temperature $T_{AX}$ and $T_{BX}$, the operation of the heavy construction can be continued without occurrence of overheat or breakdown. Thus, the process returns to the start step without controlling the temperature of the engine coolant and the hydraulic fluid. However, if even one of the respective temperatures $T_C$ and $T_H$ is higher than the allowable overheat temperatures $T_{AX}$ and $T_{BX}$, the selected operational mode of the heavy construction must be checked. Accordingly, if an overheat condition is indicated, the controller 9 performs a next inquiry step 56 wherein it determines whether the present operational mode M is in an L mode, a relatively lower speed operational mode. If the present operational mode M is not the L mode, the controller 9 performs steps 57 and 58 wherein controller 9 changes the present operational mode to the L mode and then outputs an electric signal $I_L$ to the governor motor 18 so as to control the engine governor 18 to reduce the quantity of the fuel for the engine. This results in reducing the rotative speed of the engine 1. Alternatively, if the present operational mode M is the L mode, the process simply proceeds to a step 59.

Signals corresponding to respective operational modes H, S and L, are stored in controller 9 in a preset program. The controller 9 is adapted to output an electric control signal depending on the seleoted operational mode to the governor motor 18 so as to control the engine governor 18 to control the quantity of the fuel for the engine 1.

As a result of steps 57 and 58, controller 9 reduces the rotative speed of the engine 1, thereby causing the engine coolant actual operating temperature $T_C'$ and the hydraulic fluid actual operating temperature $T_H'$ to gradually lower. Thereafter, in steps 59–61, controller 9 repeatedly checks the present operating temperatures $T_C'$ and $T_H'$ of the engine coolant and the hydraulic fluid until the actual temperatures drop below respective predetermined temperatures. At such time the controller 9 determines whether the present operational mode M is different than the originally selected mode M (step 63). If it is not, controller 9 outputs an electric signal $I_L'$ to the governor motor 18 to return the operational mode to the original mode selected.

More specifically, actual operating temperatures $T_C'$, $T_H'$ of the coolant and the hydraulic fluid are received by the controller 9 (in step 59), the temperatures $T_C'$, $T_H'$ being outputted as electric signals from the temperature sensors 12*a* and 12*b*, respectively. At the same time, an electric signal corresponding to the present operational mode M is also received by the controller 9. Thereafter, the controller 9 performs next inquiry steps 60 and 61 wherein the controller determines whether the respective temperatures $T_C'$ and $T_H'$ are equal to or lower than each safety "overheat" operational temperature. The safety temperature $T_{SA}$ for the coolant is 80° C. and the reference safety temperature $T_{SB}$ for the hydraulic fluid is 95° C. If even one of the respective temperatures $T_C'$ and $T_H'$ is higher than the respective safety temperature $T_{SA}$, $T_{SB}$, the controller 9 controls the governor motor 18 in order to continue the present operational mode, i.e. the L mode. However, if both of the respective temperatures $T_C'$ and $T_H'$ are equal to or lower than each safety temperatures $T_{SA}$, $T_{SB}$, the controller 9 then determines (in step 62) whether the present operational mode M is the initial operational mode Mi. In step 63, controller 9 determines if the present operational mode M is different than the initial operational mode Mi. If M equals Mi, the controller 9 changes the present operational mode M into the initial mode Mi. In particular, in step 64, the controller 9 controls the governor motor 18 in order to accelerate the rotative speed of the engine 1. Specifically, controller 9 generates an electric control signal $I_L'$ corresponding to the initial operational mode Mi. Signal $I_L'$ is communicated to the governor motor 18 so as to control the governor 17 to control the quantity of the fuel delivered to the engine, thereby resulting in accelerating the rotative speed of the engine as necessary to return the operational mode M to the initial mode Mi.

As described above, the control system of this invention provides an advantage in that the it automatically checks the operational temperature of the engine coolant and the hydraulic fluid by means of temperature sensors, and alarms the operator to the occurrence of overheat by means of an alarm device in case of detecting an overheat of the coolant and the hydraulic fluid.

The control system also automatically controls the operational mode in order to eliminate the overheat condition, thereby efficiently preventing the temperature of the engine coolant and the hydraulic fluid from rising over a respective predetermined safety temperature.

Additionally, the control system of the present invention provides a method and an apparatus for automatically controlling the engine of the heavy construction in order to be always optimally started. The control method and apparatus is described hereinafter in detail in conjunction with the accompanying drawings.

Figure 4:
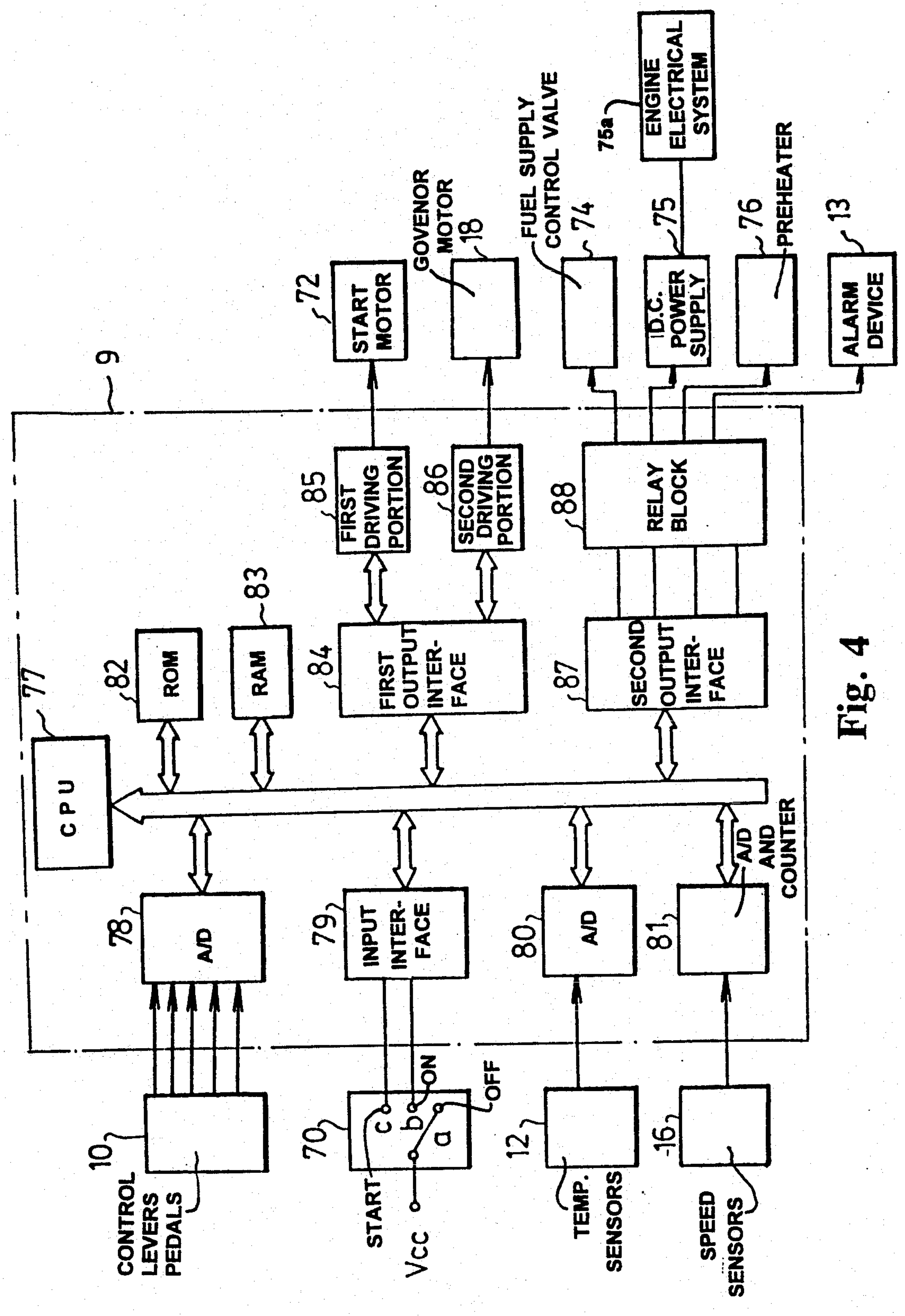
FIG. 4 is a schematic block diagram showing a construction of a control apparatus for automatically and optimally controlling a starting operation for the engine of the heavy construction in accordance with this invention.

FIG. 4 is a schematic block diagram showing a construction of the control apparatus for automatically and optimally controlling a starting operation for the engine of the heavy construction equipment in accordance with this invention.

The controller 9 comprises a central processing unit (CPU) 77, an input portion and an output portion. The input portion of the controller 9 comprises a pair of analog/digital signal converters 78 and 80 for converting input signals applied from the control levers/pedals 10 and the temperature sensors 12 to the controller 9, respectively, an analog/digital signal converter and counter 81 for converting and counting an input signal applied from the speed sensor 16 of the engine 1, and an input interface electrically connected to an engine ON/OFF switch 70. The output portion of the controller 9 comprises a ROM 82, a RAM 83, and a pair of output interfaces 84 and 87, the first output interface 84 being electrically connected to first and second driving portions 85 and 86, and the second output interface 87 being electrically connected to a relay block 88. Engine ON/OFF switch 70 is adapted to allow the operator to start or stop the operation of the engine 1 by outputting a signal corresponding to the starting or the stopping of the engine 1 to the controller 9. Specifically, the engine ON/OFF switch 70 includes an OFF position, an ON position, and a START position. Also, as previously described, the temperature sensors **12*a* and 12*b* sense the respective operating temperatures of the coolant of the engine 1**.

First driving portion 85 of the controller 9 is electrically connected to a start motor 72 for starting the engine 1 in accordance with the starting signal outputted from the engine ON/OFF switch 70, while the second driving portion 86 is electrically connected to the governor/throttle motor 18 for controlling a throttle valve of the governor 17 of the engine 1. Also, the relay block 88 of the controller 9 is electrically connected to multiple devices including a fuel supply control valve 74 for controlling the quantity of the fuel supplied from a fuel tank **18*a* to the governor 17 (FIG. 1), a D.C. power supply 75 (FIG. 6) for supplying the D.C. power to respective engine electric system 75*a* of the engine 1, a preheater 76 for preheating the engine 1 including the engine coolant, and the alarm device 13** for alarming the operator to occurrence of problem in the control system.

In operation, the control apparatus operates as follows. Upon manipulating the engine ON/OFF switch 70 from the Off position to the ON position, the throttle motor 18 is energized so as to set the throttle valve of the governor 17 to a start position simultaneously with turning on the fuel supply control valve 74 thereby accomplishing a preparation for starting.

Thereafter, upon shifting the engine ON/OFF switch from ON position to a START position, the controller 9 determines whether the control levers/pedals 10 are positioned at the neutral position. If the control levers/pedals 10 are not positioned at the neutral position, the controller 9 outputs an alarm control signal to the alarm device 13 notifying the operator that they must manipulate the control levers/pedals 10 from the present operational positions to the neutral positions. Upon detecting the manipulation of the control levers/pedals 10 from the operational positions to the neutral positions, the controller 9 starts the engine 1 by energizing the start motor 72. At this time, if the engine 1 is not started after a predetermined short crank period, the controller 9 de-energizes the start motor 72 for a short period and then again attempts to restart the engine 1 two or more times. In addition, in a situation where the engine 1 is not started due to a low temperature of the coolant of the engine 1, the controller 9 outputs a signal to the preheater 76 by way of the second output interface 87 and the relay block 88 in order to preheat the coolant of the engine 1 until the temperature of the coolant reaches to a desired temperature. The controller 9 then restarts the engine 1 after the coolant is heated to the desired temperature.

Figure 5A:
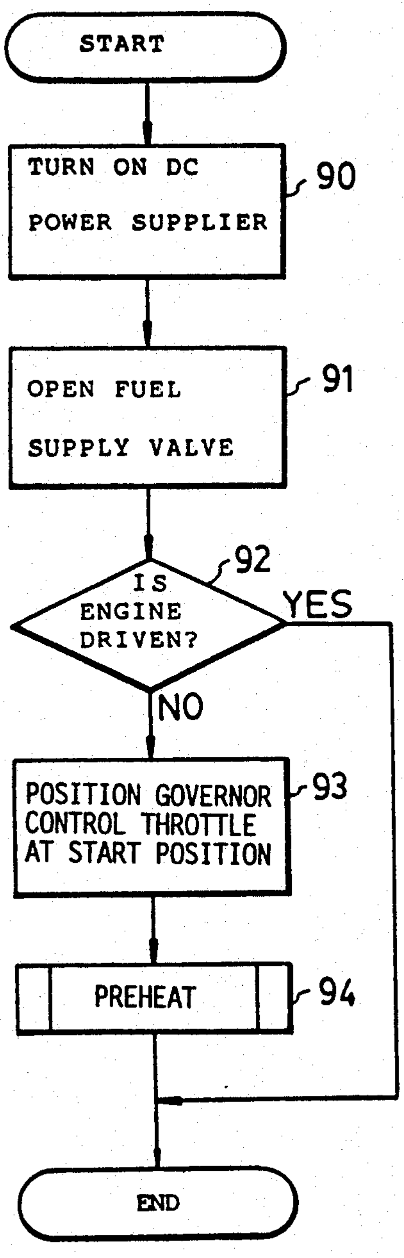
FIG. 5*a* is a flow chart showing a control method for automatically and optimally controlling the starting operation in case of shifting the engine ON/OFF switch from an OFF position to an ON position.
Figure 5B:
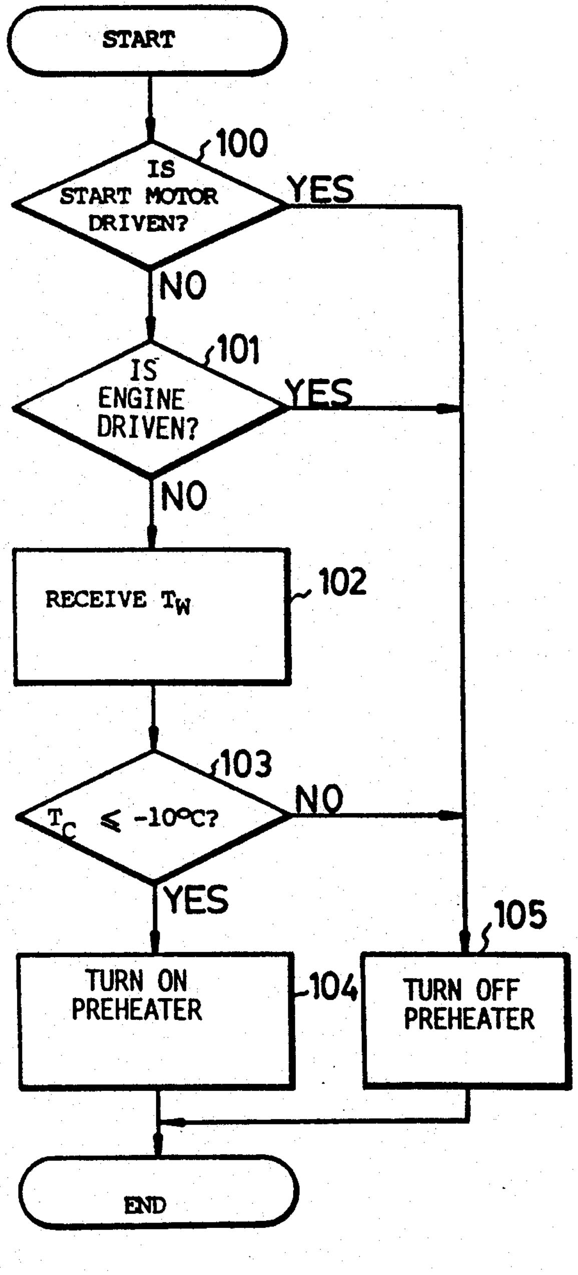
FIG. 5*b* is a flow chart showing a preheating sub-routine of FIG. 5*a;*

The above-mentioned starting control method of this invention will be described in conjunction with flow charts of FIGS. 5 and 6. First, a control method for handling the situation where the engine ON/OFF switch 70 is shifted from the OFF position to the ON position will be described in conjunction with FIGS. **5*a* and 5*b***.

The method illustrated in the flow chart of FIG. **5*a* begins upon shifting the engine ON/OFF switch 70 from the OFF position to the ON position. As the controller 9 is energized, the method proceeds to step 90 where the controller 9 turns on a relay in relay block 88 to energize D.C. power supply 75 (see FIG. 4) by means of the second output interface 87. Thus, D.C. power supply 75 is energized. As a result, the electric system 75*a* of the engine 1 is energized with D.C. power from the power supply 75. Thereafter, a relay in relay block 88 for the fuel supply control valve 74 is turned on (step 91) by means of the second output interface 87 of the controller 9 so that the fuel supply control valve 74 is opened in order to allow the fuel to be supplied from the fuel tank to the governor 17. Thereafter, the controller 9 performs an inquiry (step 92) wherein, upon receiving a signal corresponding to a rotative speed of the engine 1 from the speed sensor 71 by way of the analog/digital signal converter and counter 81, it is determined whether the engine 1 is now started (i.e. running). If the engine 1 is running, the control process proceeds to the end step. However, if the engine 1 is not started, the controller 9 performs a next step 93 wherein a pulse type of D.C. voltage signal corresponding to the starting position is outputted from the CPU 77 to both the first output interface 84 and the second driving portion 86. This causes the throttle motor 73 to move the governor controlling throttle valve 17*a* to the starting position. Thereafter, the controller 9 performs a subroutine for preheating the coolant of engine 1 such as described in a flow chart of FIG. 5*b***, and then ends the control process.

As described in the flow chart of FIG. **5*b*, the controller 9 first determines at a step 100 whether the start motor 72 is energized. If the start motor 72 is energized, the controller 9 performs a step 105 wherein the preheater 76 is turned off in order to end the control process. However, if the start motor 72 is not energized, the controller 9 performs a step 101 wherein it is determined whether the engine 1 is running. If the engine 1 is running, the controller 9 turns off the preheater 76 at the step 105 in order to end the control process. However, if the engine 1 is not running, the controller 9 receives at a next step 102 a signal corresponding to the actual temperature of the coolant of the engine 1 from the temperature sensor 12***a*. Upon receiving the signal of the coolant temperature from the sensor 12*a*, the controller determines whether the temperature of the coolant is equal to or lower than a predetermined temperature, −10+ C. If the temperature is higher than the temperature of −10° C., the controller 9 performs the step 105 in order to end the control process. However, if the temperature of the coolant is equal to or lower than the temperature of −10° C., at a step 104 the controller 9 turns on the preheater 76 in order to preheat the engine 1, and then ends the preheating control process.

Figure 6:
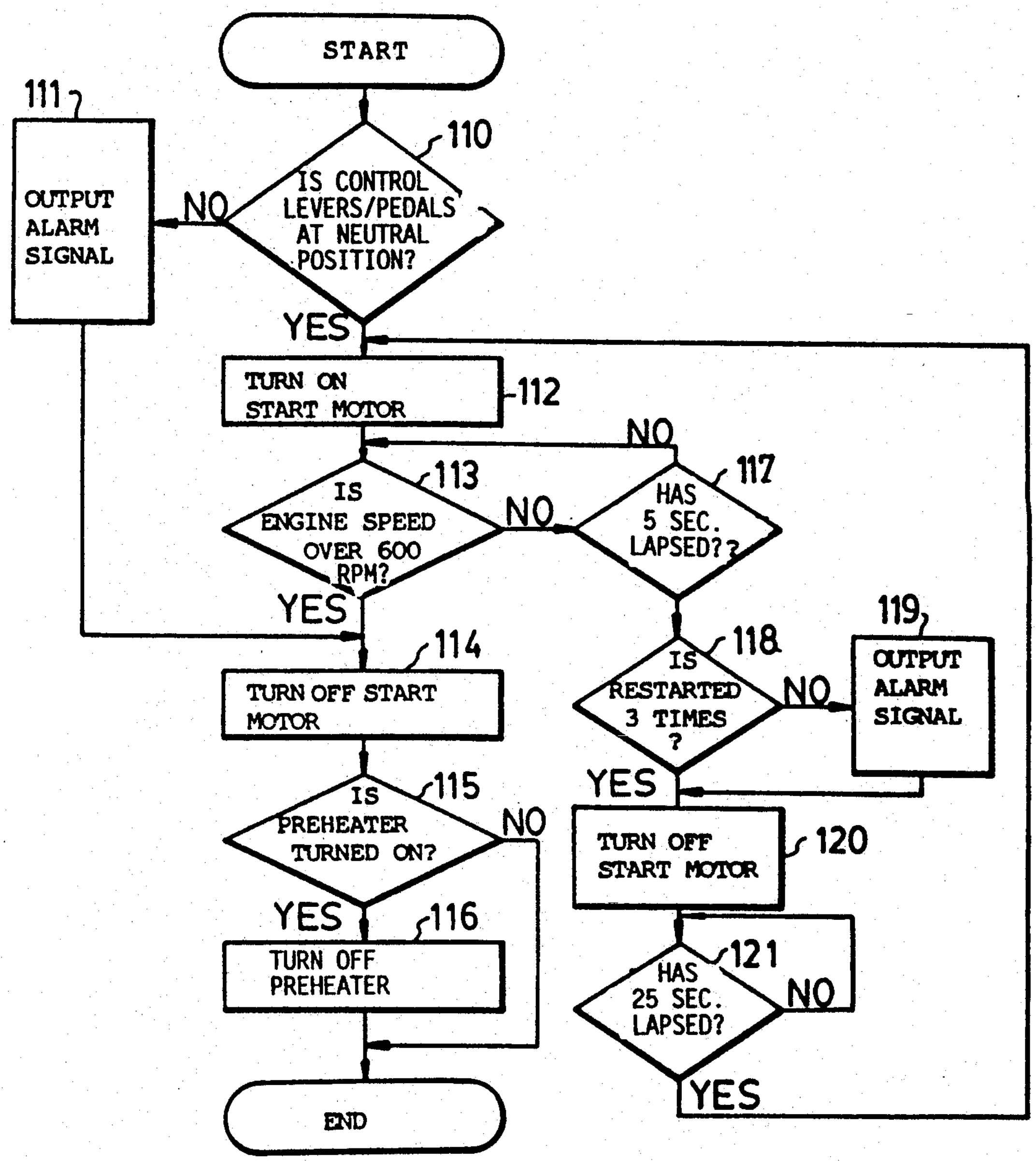
FIG. 6 is a flow chart showing a control method for automatically and optimally controlling the starting operation in case of shifting the engine ON/OFF switch from the ON position to a START position.

FIG. 6 is a flow chart showing a control process for automatically and optimally controlling the starting operation of the engine 1 wherein the engine ON/OFF switch 70 is shifted from the ON position to a START position.

Referring to the flow chart and initially to step 110, the controller 9 first checks a signal corresponding to manipulation values of the control levers/pedals 10 having been received by the analog/digital signal converter 78 in order to determine whether the control levers/pedals 10 are positioned at the neutral positions. If the control levers/pedals 10 are not positioned at the neutral positions, this means that engine 1, when it starts, will be overloaded due to the quantity of the pressurized hydraulic fluid which will be outputted from the hydraulic pumps 2 and 3. Thus, the controller 9 outputs at a step 111 an alarm control signal to the alarm device 13 in order to alarm the operator to the necessity of shifting the control levers/pedals 10 from the operational positions to the neutral positions.

However, if the control levers/pedals 10 are positioned at the neutral positions, the controller 9 performs a next step 112 wherein the controller 9 turns on the start motor 72 by way of the first output interface 84 and the first driving portion 85 thereof. Thereafter, upon having received a signal corresponding to the rotative speed of the engine 1 from the speed sensor 16 of the engine 1, the controller 9 determines at a step 113 whether the rotative speed of the engine 1 is equal to or greater than a predetermined speed. In the preferred embodiment, this predetermined speed is about 600 rpm. If the rotative speed of the engine 1 is equal to or over the speed of 600 rpm, the start motor 72 is turned off at a step 114. Thereafter, the controller 9 performs a step 115 wherein it is determined whether the preheater 76 is turned on. If the preheater 76 is turned on, the controller 9 turns off the preheater 76 (step 116) and then ends the process. If the preheater 76 is turned off, the controller 9 simply ends the process.

On the other hand, if the rotative speed of the engine 1 is lower than the speed of 600 rpm, the controller 9 performs a step 117 wherein it is determined whether 5 seconds have been lapsed under the condition that the rotative speed of the engine 1 is continuously lower than 600 rpm. The controller 9 repeatedly performs the step 113 until either 5 seconds passes or until the speed of engine 1 exceeds 600 rpm. If the 5 seconds have lapsed under the condition that the rotative speed of the engine 1 is continuously lower than 600 rpm, the controller 9 proceeds to step 118. In step 118, the controller 9 determines whether the rotative speed of the engine 1 is equal to or over the speed of 600 rpm after trying to restart engine 1 three times. If engine 1 still has not started (i.e. if the rotative speed of the engine 1 is not equal to or over than the speed of 600 rpm after three restarting attempts), the start motor 72 is turned off (step 120). Thereafter, the controller 9 determines at a next inquiry step 121 whether 25 seconds have passed after turning off the start motor 72. If the 25 seconds have passed, the process returns to the step 112. However, if the 25 seconds have not passed, the step 121 is repeatedly performed until the 25 seconds have passed. Alternatively, if the engine 1 has not started after three tries, (i.e. the result rotative speed of the engine 1 is lower than the speed of 600 rpm even though the engine 1 has been repeatedly restarted three times), the controller 9 outputs at a step 119 an alarm control signal to the alarm device 13. This causes the alarm device 13 to alert the operator of the nonstart condition. The controller 9 then performs the step 120, as discussed above.

Figure 7:
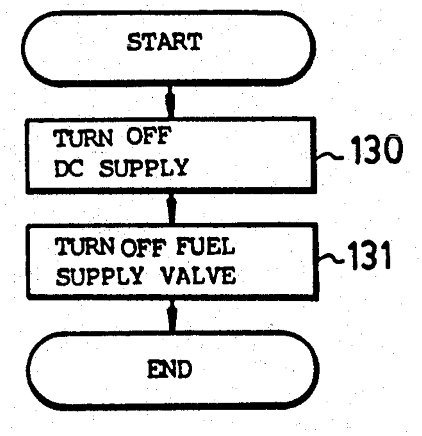
FIG. 7 is a flow chart showing a control method for automatically and optimally controlling the starting operation in case of shifting the engine ON/OFF switch from the ON position to the OFF position.

FIG. 7 is a flow chart showing a control method when the engine ON/OFF switch 70 is shifted from the ON position to the OFF position. As represented in this flow chart, at a first step 130, the controller 9 turns off the D.C. power supply 75. Thereafter, the fuel supply valve 74 is turned off at a step 131 in order to stop the operation of the engine 1.

As described above, the control system of this invention provides advantages in that the engine of the heavy construction equipment is automatically controlled in order to be always optimally started. Although the preferred embodiments of the present invention have been disclosed for illustrative purpose, those skilled in the art will appreciate that various modifications, additions and substitutions are possible, without departing from the scope and spirit of the invention as disclosed in the accompanying claims. Such modifications are to be considered as included in the following claims, unless these claims by their language expressly state otherwise.

What is claimed is:

1. A control apparatus for automatically controlling the operation of a hydraulic system, said hydraulic system comprising:
   - an engine for generating output power, the engine having a running speed and including coolant;
   - a plurality of actuators;
   - an electronic controller for controlling said hydraulic system;
   - hydraulic fluid;
   - said hydraulic pumps operably connected to the engine and said actuators which are driven by the output power of said engine and which deliver pressurized hydraulic fluid to said actuators, said main hydraulic pumps including swash plates that are moveable to various inclination angles to control the quantity of the pressurized hydraulic fluid being delivered;
   - a sub-hydraulic pump also operably connected to the engine which is driven by the output power of said engine and which is adapted to deliver pilot pressurized fluid;
   - swash plate inclination angle control valves connected to both the controller and the main pumps and which are operably connected to and driven by the pilot pressurized fluid of said sub-hydraulic pump to control the inclination angles of the swash plates of said main hydraulic pumps, and as a result, control the quantity of pressurized fluid delivered by said main pumps;

positional sensors which are provided at said actuators in order to sense positional displacement values of said actuators, said positional sensors being connected to said controller and outputting output signals corresponding to the positional displacement values to said controller;

a directional control valve block connected to both said main hydraulic pumps and said electronic controller, said valve block being adapted to control the operational direction of said actuators as well as the quantity of said pressurized fluid to be supplied to said actuators;

control levers and pedals adapted to generate output signals corresponding to manipulation values, said control levers and said pedals being operably connected to said controller for controlling said actuators;

an amplifier connected to said controller for amplifying an electric signal outputted from the controller, said amplifier being operably connected to said controller and to said swash plate inclination angle control valves;

at least one hydraulic conduit extending between the directional control valve block and the main hydraulic pumps;

relief valves operably connected to said hydraulic conduit for preventing said hydraulic conduit from being over-pressurized;

directional control solenoid valves connected to the directional control valve block;

a solenoid valve connected to said controller in order to selectively control preset pressures of the directional control solenoid valves and the relief valves;

the control apparatus comprising:

means for sensing temperatures of the engine coolant and the hydraulic fluid, said sensing means being disposed at the engine and the hydraulic pumps;

means for giving an alarm to the operator in response to a control signal from said controller when the temperature of one of the engine coolant and the hydraulic fluid are higher than respective predetermined reference overheat temperatures, said alarm means being operably electrically connected to said controller; and means for controlling the running speed of said engine, said controlling means reducing the running speed of said engine when the temperatures of one of the coolant and the hydraulic fluid are higher than the respective predetermined reference overheat temperatures, but increasing the running speed of the engine when the respective temperature of the coolant and the hydraulic fluid are lower than the respective predetermined safety operational temperatures, said controlling means being electrically connected to said controller.

2. A control apparatus according to claim 1, wherein said means for controlling the running speed of the engine comprises a motor and a governor, said motor being operably electrically connected to said controller so that said motor is driven in response to a control signal outputted from said controller, said governor being disposed at said engine and electrically connected to said motor so that said governor controls the quantity of fuel supplied to the engine, thus controlling the running speed of said engine.

3. A control method for automatically controlling the operation of a hydraulic system using a control apparatus, the hydraulic system including hydraulic fluid, said control apparatus comprising providing an engine including coolant and having a running speed, a controller for controlling the running speed, means connected to the controller for sensing temperatures of the engine coolant and the hydraulic fluid of said hydraulic system, means connected to the controller for giving an alarm to the operator in response to a control signal from the controller when one or both of the temperatures of the engine coolant and the hydraulic fluid are higher than respective predetermined reference overheat temperatures, means connected to the controller for controlling the running speed of the engine in such a manner that said means reduces the running speed of said engine when the temperatures of the coolant and the hydraulic fluid are higher than a respective predetermined reference overheat temperatures, but which also increases the running speed of the engine when the temperatures of the coolant and the hydraulic fluid are lower than predetermined safety operational temperatures, means for generating a signal corresponding to an initial operational mode of the hydraulic system and to additional operational modes of the hydraulic system, the control method comprising the steps of:

receiving the signals corresponding to the respective temperatures of the engine coolant and the hydraulic fluid outputted from said means for sensing temperatures and receiving the signal corresponding to an initial operational mode of the hydraulic system, and then comparing said respective temperatures with said respective predetermined reference overheat temperatures, respectively;

outputting an alarm signal to said means for giving an alarm to the operator when at least one of said temperatures is above said respective predetermined reference overheat temperature; and receiving updated signals corresponding to present temperatures of the engine coolant and the hydraulic fluid outputted from said means for sensing temperatures and receiving an updated signal corresponding to a present operational mode of the hydraulic system, and then comparing said respective present temperatures with said respective predetermined reference overheat temperatures, respectively, and also comparing said present operational mode with said initial operational mode.

4. A control method for automatically controlling the operation of a hydraulic system using a control apparatus, said hydraulic system comprising an engine for generating output power, the engine including engine coolant; a plurality of actuators; main hydraulic pumps operably connected to the engine, said main hydraulic pumps being driven by the output power of said engine and being operably connected to said actuators to deliver pressurized hydraulic fluid to said actuators, said main hydraulic pumps including a swash plate to control the quantity of hydraulic fluid being pumped; a controller; control levers and pedals adapted to generate output signals corresponding to manipulation values, said control levers and said pedals being operably connected to said controller for controlling said actuators; swash plate inclination angle control valves for controlling the inclination angles of the swash plates of said main hydraulic pumps in order to control quantity of the pressurized fluid to be delivered by said main hydraulic pumps; a hydraulic conduit for allowing said pressurized fluid to be supplied to said actuators from said main hydraulic pumps; relief valves operably connected to said hydraulic conduit to prevent over-pressurization of said hydraulic conduit; directional control solenoid valves for controlling quantity and flow direction of the pressurized fluid to be supplied to said actuators, and a solenoid valve for selectively controlling preset pressures of said directional control solenoid valves and said relief valves; the control apparatus comprising means for sensing respective temperatures of the engine coolant and the pressurized hydraulic fluid of said hydraulic system and means for generating signals representing same, said control method comprising the steps of:

receiving the signal corresponding to the temperature of the hydraulic fluid and receiving the signals corresponding to the manipulation values for controlling the actuators outputted from said control levers and pedals, and then comparing said temperature of the pressurized hydraulic fluid with a predetermined permissible lowest temperature and also determining whether said manipulation values are zero;

when the temperature of the hydraulic fluid is lower than said predetermined permissible lowest temperature and the manipulation values are zero, outputting a control signal to said swash plate inclination angle control valves in order to maximize the quantity of the pressurized hydraulic fluid being delivered by said main hydraulic pumps and simultaneously outputting control signals to said directional control solenoid valves and said solenoid valve to increase the resistance between the pressurized hydraulic fluid and the relief valves when the pressurized hydraulic fluid passes through the relief valves to thereby cause the temperature of the pressurized hydraulic fluid of the main hydraulic pumps to rise at an accelerated rate because of the increased pressure loss at the relief valves; and receiving an updated signal corresponding to the present temperature of the hydraulic fluid as it is heated and upon comparison of the present temperature of the hydraulic fluid with a predetermined desired operational temperature, shutting off said control signals having been applied to both the swash plate inclination angle control valves and the solenoid valves when said temperature of the hydraulic fluid is higher than said predetermined desired operational temperature, whereby the temperature of the pressurized fluid is automatically controllably preheated in order to reach said predetermined desired operational temperature.

5. A control method for automatically controlling the operation of a hydraulic system using a control apparatus, said hydraulic system comprising an engine for generating output power for driving hydraulic pumps, the engine including coolant and a running speed, and control levers and pedals for outputting signals corresponding to manipulation values for controlling said actuators, the control levers and pedals having a neutral position; said control apparatus comprising an engine ON/OFF switch for generating a starting signal, the engine ON/OFF switch having an ON position and a START position, a controller which is electrically connected to the engine ON/OFF switch for outputting a signal corresponding to starting and stopping of said engine, a start motor for driving said engine in response to the starting signal outputted from said engine ON/OFF switch, a governor for the engine including a throttle valve, a throttle motor for controlling the throttle valve of the governor of said engine, means for sensing the running speed of said engine, means for sensing the temperature of the engine coolant, a fuel supply control valve for controlling fuel supply from a fuel tank to said governor of the engine, a D.C. power supply for supplying D.C. power to the engine ON/OFF switch and the start motor of said engine, a preheater for preheating said engine and an alarming device for giving an alarm to the operation when said hydraulic system has a problem, said control method comprising the steps of:

when said engine ON/OFF switch is positioned at its ON position, driving said throttle motor in order to set said throttle valve of the governor to a starting position simultaneously with turning on said fuel supply control valve;

when said engine ON/OFF switch is positioned at its START position, determining whether the control levers and pedals are positioned at their neutral positions;

when the control levers and pedals are positioned at their neutral positions, turning on said start motor in order to cause said engine to start and then determining whether an actual running speed of the engine is higher than a predetermined running speed;

when said running speed of the engine is higher than said predetermined running speed, turning off the start motor in order to end the starting operation;

when the engine does not start and thus the running speed of the engine is lower than said predetermined running speed, repeatedly generating a restart signal to make said engine restart a limited number of additional times; and when the temperature of the engine coolant is lower than a predetermined temperature, turning on said preheater.

6. A control apparatus for automatically controlling the operation of a hydraulic system, said hydraulic system including hydraulic fluid, an engine for generating output power, and means for cooling the engine, the control apparatus comprising:

a controller for controlling the hydraulic system;

means for sensing temperatures of the engine cooling means and the hydraulic fluid;

means for giving an alarm to the operator in response to a control signal from said controller when the temperature of one of the engine coolant and the hydraulic fluid are higher than respective predetermined reference overheat temperatures, said alarm means being operably connected to said controller; and means for controlling the running speed of said engine, said means reducing the running speed of said engine when the temperatures of one of the coolant and the hydraulic fluid are higher than the respective predetermined reference overheat temperatures, but increasing the running speed of the engine when the respective temperature of the coolant and the hydraulic fluid are lower than the respective predetermined safety operational temperatures, said controlling means being operably connected to said controller.

7. A control apparatus according to claim 6, wherein said controlling means includes a governor, said governor being operably electrically connected to said controller so that said governor is operably controlled by said controller, said governor controlling the quantity of fuel supplied to the engine and thus controlling the running speed of said engine.

8. A control method for automatically controlling the operation of a hydraulic system using a control apparatus including a hydraulic system with hydraulic fluid therein, said control apparatus including an engine with a coolant system having coolant therein and further including a controller for controlling the hydraulic system, said control apparatus being selectably adjustable to various operational modes, the control method comprising the steps of:

automatically determining the respective temperatures of the engine coolant and the hydraulic fluid and determining the initial operational mode of the hydraulic system, and then comparing said respective temperatures with respective predetermined reference overheat temperatures, respectively;

alarming an operator when at least one of said temperatures is above said respective predetermined reference overheat temperature;

automatically determining updated temperatures of the engine coolant and the hydraulic fluid and determining an updated present operational mode of the hydraulic system, and then comparing said respective present temperatures with said respective predetermined reference overheat temperatures, respectively, and also comparing said present operational mode with said initial operational mode; and switching to an operational mode having a reduced engine speed if the comparison shows the temperature of the coolant or the hydraulic fluid as being above the overheat temperatures.

9. A control method for automatically controlling the operation of a hydraulic system using a control apparatus, said hydraulic system including hydraulic fluid, actuators, an engine for powering the hydraulic system, pumps driven by the engine for pumping the hydraulic fluid to the actuators, the pumps including swash plates for controlling pump delivery volumes, means for controlling the hydraulic fluid flow including relief valves and swash plate angle inclination control valves, the control apparatus including a controller for controlling the hydraulic system, solenoid valves connected to the controller for controlling the SPIAC valves and the relief valves, and control levers and pedals operably connected to said controller and manipulatable by an operator for generating manipulation signals to the controller;

said control method comprising the steps of:

determining the temperature of the hydraulic fluid, and receiving the manipulation valves for controlling the actuators outputted from said control levers and pedals, and then comparing the temperature of the hydraulic fluid with a predetermined permissible lowest temperature;

determining whether said manipulation values are zero;

when the temperature of the hydraulic fluid is lower than said predetermined permissible lowest temperature and the manipulation values are zero, outputting a control signal to said swash plate angle inclination control vales in order to maximize the quantity of the pressurized hydraulic fluid being delivered by said main hydraulic pumps and simultaneously outputting control signals to said solenoid valves to increase the resistance between the pressurized hydraulic fluid and the relief valves when the pressurized hydraulic fluid passes through the relief valves to thereby cause the temperature of the pressurized hydraulic fluid to rise at an accelerated rate due to the increased pressure loss at the relief valves;

determining an updated present temperature of the hydraulic fluid and comparing the updated temperature with a predetermined desired operational temperature; and shutting off said control signals having been applied to both the swash plate angle inclination control valves and the solenoid valves when said updated temperature of the hydraulic fluid is higher than said predetermined desired operational temperature, whereby the temperature of the pressurized fluid is automatically controllably preheated in order to reach said predetermined desired operational temperature.

* * * * *

UNITED STATES PATENT AND TRADEMARK OFFICE

CERTIFICATE OF CORRECTION

PATENT NO. : 5,251,440

DATED : October 12, 1993

INVENTOR(S) : Bong-dong et al.

Figure 1B:
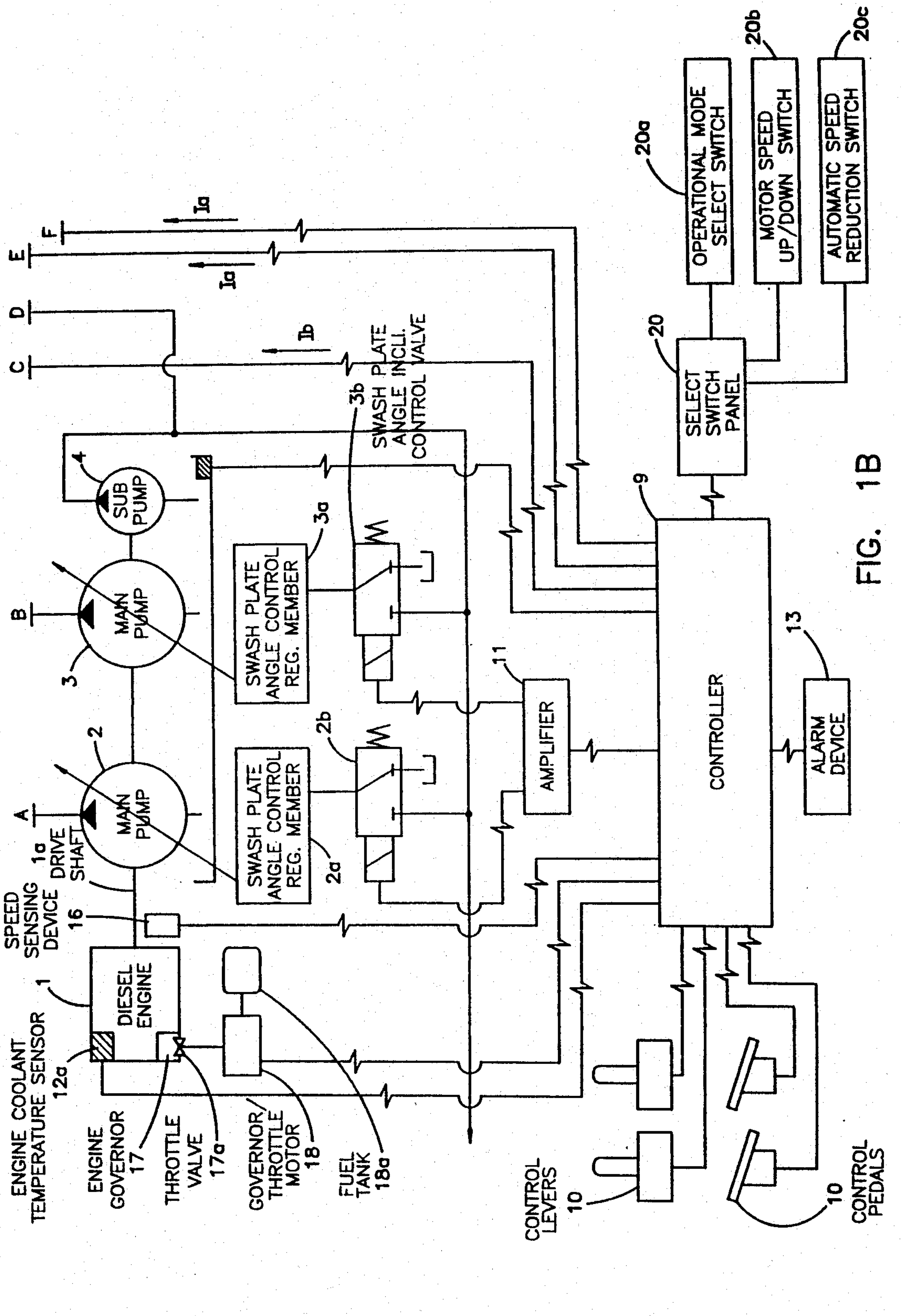

It is certified that error appears in the above-indentified patent and that said Letters Patent is hereby corrected as shown below:

column 5, line 68: after "and" delete --,--;

column 7, lines 17-19: "FIG. 1 is a partial schematic circuit diagram showing" should be --FIGURES 1A and 1B are fragmentary hydraulic circuits which combine to show--;

column 7, line 51: delete "FIG. 1" and insert therefor --FIGS. 1A and 1B--;

column 12, line 8: "seleoted" should be --selected--;

column 15, line 11: "-10+C." should be -- -10° C.--;

Column 20, line 12, claim 5, "operation" should read --operator--;

column 22, line 21, claim 9: "vales" should be --valves--.

Signed and Sealed this

Fifth Day of July, 1994

Attest:

Bruce Lehman

BRUCE LEHMAN

*Attesting Officer*

*Commissioner of Patents and Trademarks*